United States Patent
Kim et al.

[11] Patent Number: 5,920,496
[45] Date of Patent: Jul. 6, 1999

[54] HIGH SPEED CORRELATOR USING UP/DOWN COUNTER

[75] Inventors: Ki Seok Kim; Kyong Min Ha, both of Daejon-Shi, Rep. of Korea

[73] Assignee: Electronics and Telecommunications Research Institute, Daejon-Shi, Rep. of Korea

[21] Appl. No.: 08/986,614

[22] Filed: Dec. 8, 1997

[30] Foreign Application Priority Data

Dec. 9, 1996 [KR] Rep. of Korea ...................... 96-63153

[51] Int. Cl.[6] ...................................................... G06F 17/15
[52] U.S. Cl. ...................................................... 364/728.03
[58] Field of Search .................... 364/728.03, 728.01, 364/717.01; 375/208–210, 367; 370/320, 335, 342, 441, 515; 380/46

[56] References Cited

U.S. PATENT DOCUMENTS 5,020,015  5/1991  Jones et al. .................. 364/728.03
5,305,245  4/1994  Kurihara ...................... 364/717.01

*Primary Examiner*—Tan V. Mai
*Attorney, Agent, or Firm*—Cohen, Pontani, Lieberman & Pavane

[57] ABSTRACT

The present discloses a high speed correlator which can increase or decrease the bit counters bit by bit depending on the correlation degree of the input signal and the PN sign during a given period by using an up/down counter which can be easier implemented and has a faster response speed than a conventional adder, and which can obtain a correlation value between the values of each of the bit counters by using the bit shifter and the adder.

6 Claims, 1 Drawing Sheet

5,920,496

HIGH SPEED CORRELATOR USING UP/DOWN COUNTER

FIELD OF THE INVENTION

1. Field of the Invention

The present invention relates to a high speed correlator which can increase or decrease the bit counters bit by bit depending on the correlation degree of the input signal and the PN sign during a given period by using an up/down counter which can be easily implemented and have a fast response speed, and which can obtain a correlation value between the values of each of the bit counters by using the bit shifter and the adder.

2. Description of the Prior Art

In a code division multiple access(CDMA) system, in order to obtain correlation between the data sequentially inputted thereto and the PN sign generating at a PN generator having a specific offset, the data of N bits being inputted thereto are converted, if necessary, and consecutively added with previous values of the adder during a given period to obtain correlation values. However, in case that the number of the bit are large, the response speed of the adder becomes significantly reduced, thereby making it difficulty to be used in a high speed application.

Referring now to FIG. 1, there is shown a structure of a correlator of a conventional code division multiple access (CDMA) system.

The conventional CDMA system includes data latches 101, a PN generator 102, a data converter 103 and a M bit adder 104. In the adder used in this conventional correlator, as the number of bits becomes increased so the structure thereof becomes more complicated and the speed thereof becomes significantly reduced, thereby making difficult to be used in a high speed correlator.

SUMMARY OF THE INVENTION

It is an object of the present invention to solve the problems involved in the prior art, and to provide a high speed correlator using an up/down counter which can obtain a correlation value even for the data being inputted at a high speed by constructing a correlator which is relatively simple in structure and can be operated at a high speed.

To achieve the above object, the high speed correlator using an up/down counter according to the present invention characterizes that it comprises a PN generator capable of generating a PN code having a given offset; latch means using the data of N-bits as an input; a control signal generator for outputting a first and second control signals using the output data from the PN generator and the data latch means as an input; a data converter for converting the data depending on the first signal using the output data from the data latch means as an input; a plurality of bit counters for increasing or decreasing the present count depending on the second control signal using the output data from the data converter as an input; a plurality of data latch means for storing the data using the output data from each of the plurality of bit counters as an input; a bit shifter for shifting the data stored at the plurality of data latch means; and a M-bit adder using the data shifted through the bit shifter as an input.

According to the present invention, in case that the correlator is consisted of a specific number, for example a for a parallel processing, it can be understood that it can be implemented with counters having the number of N×α and a single adder in the present invention although the specific numbers of adders are required in a prior art.

BRIEF DESCRIPTION OF THE DRAWINGS

For fuller understanding of the nature and object of the invention, reference should be had to the following detailed description taken in conjunction with the accompanying drawings in which.

Similar reference characters refer to similar parts in the several views of the drawings.

DETAILED DESCRIPTION OF PREFERRED EMBODIMENT

Figure 2:
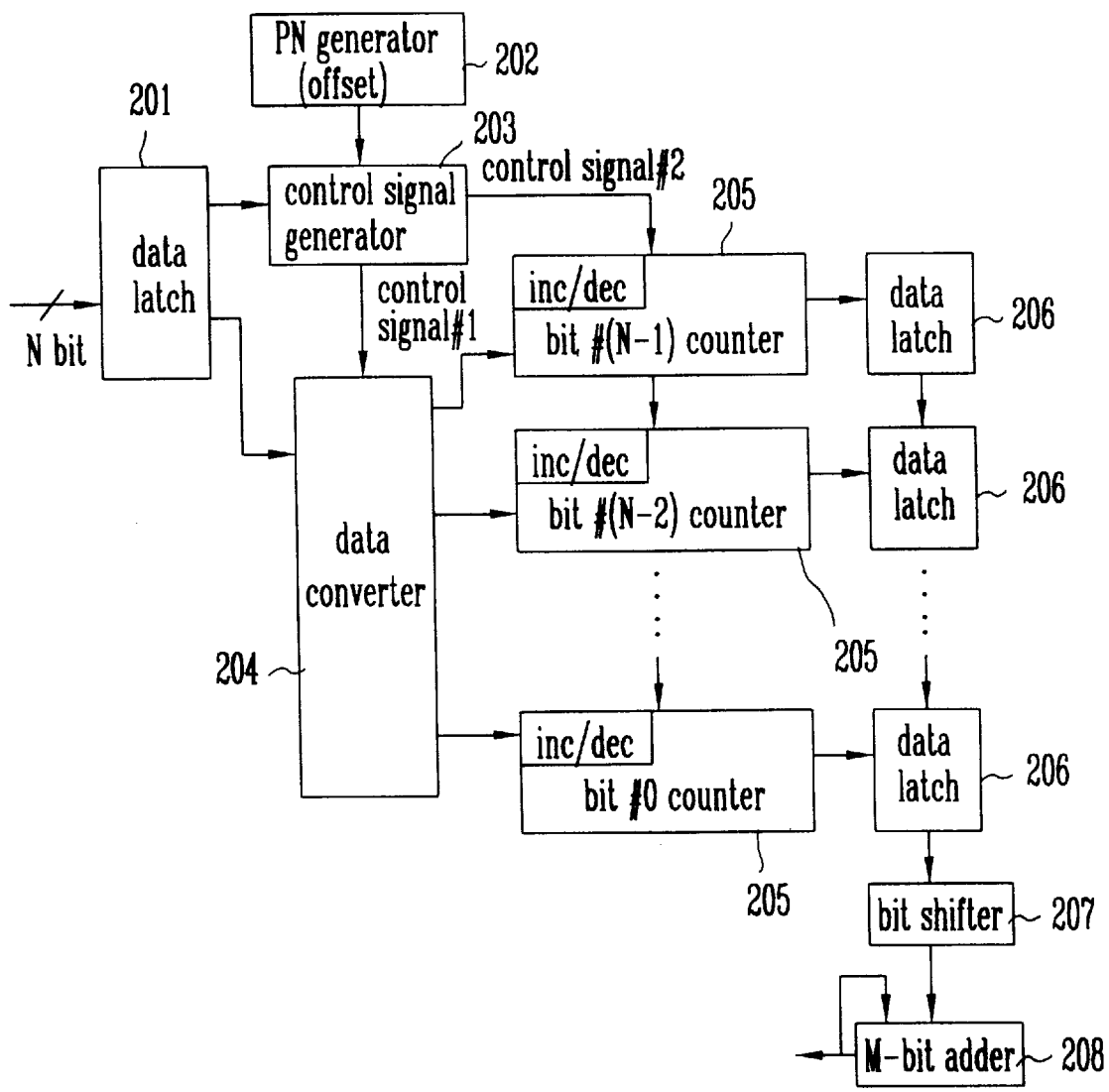
FIG. 2 is a structure of a correlator using an up/down counter according to the present invention.

The preferred embodiment of the present invention will be now explained referring to FIG. 2 showing a structure of a correlator using an up/down counter according to the present invention.

First, correlation is obtained between the PN code having a specific offset, which is generated from the PN generator 202, and the data of N-bit which are sequentially inputted to the data latches 201. A control signal generator 203 combines the most significant bit of the date being inputted thereto and the sign of the PN code to produce a first and second signals #1 and #2. The first control signal #1 is inputted to the data converter 204 which then performs a data conversion for the input signal when the sign of the input signal is negative. And, the second control signal #2 is inputted to the bit counters 205, which then generates a decrease signal when the sign of the input signal is positive and the PN sign requires subtraction and the sign of the input signal is negative and the PN sign requires addition, and generates an increase signal when the sign of the input signal is positive and the PN sign requires addition and the sign of the input signal is negative and the PN sign requires subtraction, and increases or decreases the counter depending on the output signal of the data converter. After all the data are inputted for a specific offset, that is after an operation during a specific period has been completed, the bit counters 205 having the N number are given specific values corresponding to the correlation value, and then store them into the data latches 206 using an another control signal. As a result, the bit counters 205 are initiated to 0. After the counting values stored at the data latches 206 are bit shifted by the bit shifter 207 depending on the position of the bits, they are inputted into the M-bit adder 208 and added with the existing values resulting from the adder. Correlation value may be thus obtained by performing the process mentioned above.

Figure 1:
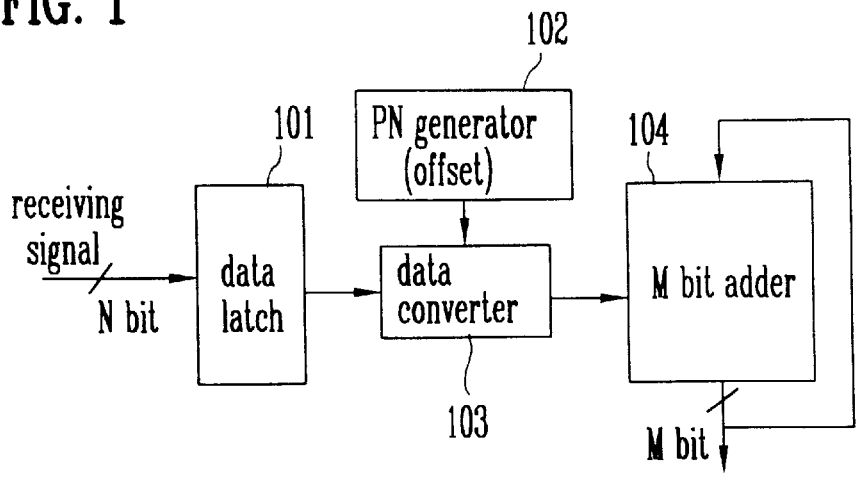
FIG. 1 is a structure of a correlator of a conventional code division multiple access (CDMA) system.

As described above, though the conventional art using the 14-bit adder in FIG. 1 can obtain a correlation value only for the data the input speed of which is less than about 20 MHZ, the present invention can obtain a correlation value even for the data the input speed of which is less than about 90 MHz. In addition, the present invention can implement a logic with EPLD, thereby simplifying the manufacture of the board and thus making it suitable to be used for a future ASIC design.

The foregoing description, although described in its preferred embodiment with a certain degree of particularity, is only illustrative of the principles of the present invention. It is to be understood that the present invention is not to be limited to the preferred embodiment variations that may be made within the scope and spirit of the present invention are to be encompassed as further embodiments of the present invention.

What is claimed is:

1. A correlator using an up/down counter comprising:

a PN generator capable of generating a PN code having a preselected offset;

a first data latch means for receiving N-bits data and outputting a first and a second stream of data;

a control signal generator operatively connected to said PN generator and said first data latch means for receiving and combining the PN code from the PN generator and the first stream of data from the first data latch means and outputting a first and a second control signal;

a data converter operatively connected to said first data latch means and said control signal generator for receiving the first control signal and the second stream of data and converting the second stream of data based on the first control signal, said data converter outputting a stream of converted data;

a bit counter means having a count and responsive to the second control signal for receiving the stream of converted data from said data converter, adjusting by one of increasing and decreasing the count based on the second control signal, and outputting data;

a second data latch means for storing data outputted from said bit counter means;

a bit shifter operatively connected to said second data latch means for shifting the data stored at said second data latch means; and an M-bit adder operatively connected to said bit shifter and using the data shifted by the bit shifter as input.

2. The correlator of claim 1, wherein the first control signal includes a negative sign and said data converter performs data conversion when the sign of the first control signal is negative.

3. The correlator of claim 1, wherein the PN code includes a sign, the second control signal includes a positive sign, and said bit counter means outputs a decrease signal when the sign of the second control signal is positive and the PN sign requires subtraction.

4. The correlator of claim 1, wherein the PN code includes a sign, the second control signal includes a positive sign, and said bit counter means outputs an increase signal when the sign of the second control signal is positive and the PN sign requires addition.

5. The correlator of claim 1, wherein the PN code includes a sign, the second control signal includes a negative sign, and said bit counter means outputs a decrease signal when the sign of the second control signal is negative and the PN sign requires addition.

6. The correlator of claim 1, wherein the PN code includes a sign, the second control signal includes a negative sign and said bit counter means outputs an increase signal when the sign of the second control signal is negative and the PN sign requires subtraction.

* * * * *